(12) United States Patent
Grande et al.

(10) Patent No.: US 8,270,184 B2
(45) Date of Patent: *Sep. 18, 2012

(54) ISOLATED VOLTAGE CONVERTER WITH FEEDBACK ON THE PRIMARY WINDING AND PASSIVE SNUBBER NETWORK, AND CORRESPONDING CONTROL METHOD

(75) Inventors: Michele Grande, Avola (IT); Salvatore Tumminaro, Marianopoli (IT); Salvatore Giombanco, Cassaro (IT); Alfio Pasqua, Piedimonte Etneo (IT); Claudio Adragna, Monza (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 822 days.

This patent is subject to a terminal disclaimer.

(21) Appl. No.: 12/324,412

(22) Filed: Nov. 26, 2008

(65) Prior Publication Data

US 2009/0147546 A1    Jun. 11, 2009

(30) Foreign Application Priority Data

Nov. 29, 2007   (IT) .............................. TO2007A0862

(51) Int. Cl.
*H02M 3/335*     (2006.01)
(52) U.S. Cl. .................................................. 363/21.12
(58) Field of Classification Search .................... 363/20, 363/21.01, 21.12, 21.16, 21.17, 21.18
See application file for complete search history.

(56) References Cited

U.S. PATENT DOCUMENTS

| 4,688,158 | A | * | 8/1987 | Peterson et al. ........... 363/21.18 |
|---|---|---|---|---|
| 4,975,823 | A | | 12/1990 | Rilly et al. |
| 5,783,962 | A | | 7/1998 | Rieger |
| 5,874,841 | A | * | 2/1999 | Majid et al. ..................... 327/94 |
| 5,956,241 | A | | 9/1999 | Locascio |
| 5,956,242 | A | * | 9/1999 | Majid et al. ................ 363/21.16 |
| 5,978,241 | A | | 11/1999 | Lee |
| 5,982,640 | A | * | 11/1999 | Naveed et al. ............ 363/21.15 |
| 6,122,180 | A | | 9/2000 | Seo et al. |
| 6,445,598 | B1 | | 9/2002 | Yamada |
| 6,894,910 | B1 | | 5/2005 | Wu |
| 6,990,000 | B1 | | 1/2006 | Rodriguez et al. |
| 7,525,819 | B2 | | 4/2009 | Choi |
| 7,545,657 | B2 | | 6/2009 | Shimada et al. |
| 7,561,446 | B1 | * | 7/2009 | Vinciarelli ....................... 363/17 |
| 7,719,860 | B2 | | 5/2010 | Usui |
| 7,859,859 | B2 | * | 12/2010 | Clarkin .......................... 363/16 |

(Continued)

OTHER PUBLICATIONS

European Search Report for European Application No. EP08170303, European Patent Office, Munich, Oct. 18, 2010, pp. 3.

*Primary Examiner* — Jue Zhang
(74) *Attorney, Agent, or Firm* — Graybeal Jackson LLP

(57) ABSTRACT

An embodiment of a voltage converter, provided with: a voltage transformer having a primary winding receiving an input voltage, a secondary winding supplying an output voltage, and an auxiliary winding supplying a feedback voltage correlated to the output voltage; a main switch, coupled to the primary winding; a control circuit, which controls switching of the main switch and has a sampling stage for sampling and holding the feedback voltage and supplying a sampled signal; and a voltage limiting circuit, provided with a clamp capacitor, designed to be coupled across the primary winding. A sampling control stage is coupled to the sampling stage, and is designed, during a given operating condition of the voltage converter, to enable updating of the sampled signal on the basis of a state of charge of the clamp capacitor.

56 Claims, 6 Drawing Sheets

U.S. PATENT DOCUMENTS

| | | |
|---|---|---|
| 2001/0033498 A1* | 10/2001 | Lee .................................. 363/17 |
| 2001/0033501 A1 | 10/2001 | Nebrigic |
| 2002/0071294 A1 | 6/2002 | Yasumura |
| 2003/0001548 A1 | 1/2003 | Feldtkeller |
| 2003/0206425 A1 | 11/2003 | Zhang |
| 2004/0080962 A1 | 4/2004 | Charych |
| 2004/0257839 A1* | 12/2004 | Yang et al. ................. 363/21.12 |
| 2005/0073862 A1 | 4/2005 | Mednik et al. |
| 2006/0050539 A1 | 3/2006 | Yang et al. |
| 2006/0152951 A1 | 7/2006 | Fagnani et al. |
| 2006/0209571 A1* | 9/2006 | Aso et al. .................... 363/21.01 |
| 2006/0250824 A1* | 11/2006 | Wekhande et al. ............. 363/20 |
| 2007/0047269 A1 | 3/2007 | Hachiya |
| 2008/0104432 A1 | 5/2008 | Vinayak |
| 2009/0086513 A1 | 4/2009 | Lombardo et al. |
| 2009/0140712 A1 | 6/2009 | Giombanco et al. |
| 2009/0141520 A1 | 6/2009 | Grande et al. |
| 2009/0147546 A1 | 6/2009 | Grande et al. |
| 2009/0175057 A1 | 7/2009 | Grande et al. |

* cited by examiner

ISOLATED VOLTAGE CONVERTER WITH FEEDBACK ON THE PRIMARY WINDING AND PASSIVE SNUBBER NETWORK, AND CORRESPONDING CONTROL METHOD

PRIORITY CLAIM

The present application claims the benefit of Italian Patent Application Serial No.: TO2007A000862, filed Nov. 29, 2007, which application is incorporated herein by reference in its entirety.

RELATED APPLICATION DATA

This application is related to the U.S. patent application Ser. Nos.: 12/324,194 entitled ISOLATED VOLTAGE CONVERTER WITH FEEDBACK ON THE PRIMARY WINDING, AND CORRESPONDING METHOD FOR CONTROLLING THE OUTPUT VOLTAGE, filed Nov. 26, 2008, application Ser. No. 12/324,062 entitled ISOLATED VOLTAGE CONVERTER WITH FEEDBACK ON THE PRIMARY WINDING, AND CORRESPONDING METHOD FOR CONTROLLING THE OUTPUT VOLTAGE, filed Nov. 26, 2008 and application Ser. No. 12/324,548 entitled SELF-SUPPLY CIRCUIT AND METHOD FOR A VOLTAGE CONVERTER, filed Nov. 26, 2008; all of the foregoing applications are incorporated herein by reference in their entireties.

TECHNICAL FIELD

An embodiment relates to an isolated voltage converter with feedback on the primary winding and passive snubber network, and to a corresponding control method. In particular, the ensuing treatment will refer, without this implying any loss in generality, to a switching converter of a flyback type, with PWM (Pulse Width Modulation) control.

BACKGROUND

Known are voltage converters (or, in a similar way, regulators or power supplies) having a galvanic insulation between an input voltage and a regulated output voltage, having a desired value, wherein the galvanic insulation is obtained via a transformer having a primary winding receiving the input voltage, and a secondary winding supplying the regulated output voltage. Generally used are two techniques for controlling these voltage converters, which envisage a feedback either on the secondary side or on the primary side of the transformer. In the first case, a feedback voltage is taken directly on a secondary winding of the transformer, in parallel to the output, and sent to a regulation circuit via an optocoupler device, so as to maintain the galvanic insulation. In the second case, the feedback voltage is generally taken on an auxiliary winding, purposely provided on the primary side of the transformer. The feedback on the primary side makes it possible to avoid the use of external insulation devices (for example, additional optocouplers or transformers), but entails higher levels of consumption and hence a degradation of the efficiency of regulation.

A wide range of control techniques has been proposed for implementing an efficient voltage regulation with feedback from the primary winding, but so far none of these has proven altogether satisfactory.

In particular, the use has been proposed of a purposely provided sample-and-hold device for sampling the feedback voltage on the auxiliary winding at the end of demagnetization of the transformer, i.e., when the value of this voltage corresponds to the value of the output voltage, being, in a know way, a faithful replica thereof.

In detail, and as is shown in FIG. 1, a voltage converter 1, of an isolated flyback type with control of the peak current and feedback on the primary winding, has a first input terminal $IN_1$ and a second input terminal $IN_2$, which are designed to receive an input voltage $V_{in}$, for example from a voltage generator 2, and a first output terminal and a second output terminal $OUT_2$, between which an output capacitor 3 is $OUT_1$ coupled and an output voltage $V_{out}$ with regulated value is present. The voltage converter 1 supplies to a load an output current $I_{out}$.

The voltage converter/comprises a transformer 4, having a primary side and a secondary side electrically isolated from the primary side, and having a primary winding 5, a secondary winding 6, and an auxiliary winding 7 (the latter positioned on the primary side of the transformer 4). For example, the transformer 4 has a turn ratio N between the primary winding 5 and the secondary winding 6, and a unit turn ratio between the secondary winding 6 and the auxiliary winding 7. The primary winding 5 has a first terminal, which is coupled to the first input terminal $IN_1$, and a second terminal, which is coupled to a control switch 8, which can be actuated for controlling PWM operation of the voltage converter 1. The secondary winding 6 has a respective first terminal, which is coupled to the first output terminal $OUT_1$, via the interposition of a first rectifier diode 9, and a respective second terminal, which is coupled to the second output terminal $OUT_2$. The auxiliary winding 7 has a respective first terminal, on which an auxiliary voltage $V_{aus}$ is present and which is coupled to a resistive divider 10, and a respective second terminal, which is coupled to a reference potential. FIG. 1 shows the magnetization inductance $L_m$ of the primary winding of the transformer 4, coupled across the primary winding 5, and the leakage inductance $L_{pe}$ of the same primary winding 5, coupled to the first input terminal $IN_1$.

The control switch 8, for example a power MOS transistor, has a first conduction terminal, which is coupled to the primary winding 5, a second conduction terminal, which is coupled to the reference potential, via the interposition of a sense resistor 11, and a control terminal, which is coupled to a control circuit 12, designed to control PWM operation of the voltage converter 1.

The resistive divider 10 includes a first resistor 13 and a second resistor 14, which are coupled in series between the first terminal of the auxiliary winding 7 and the reference potential and define an intermediate node 15 having a feedback voltage $V_{fb}$ (proportional to the auxiliary voltage $V_{aus}$).

The voltage converter 1 further comprises a self-supply capacitor 16, which is coupled to the auxiliary winding 6 via the interposition of a second rectifier diode 17 and is designed to supply, in a known way, a self-supply voltage $V_{cc}$ to the control circuit 12 during the demagnetization of the transformer 4.

In detail, the control circuit 12 has a first input, which is coupled to the intermediate node 15 and receives the feedback voltage $V_{fb}$, a second input, which is coupled to the sense resistor 11 and receives a sense voltage $V_s$ (proportional to the current circulating in the primary winding 5), and an output, which is coupled to the control terminal of the control switch 8 and supplies a driving signal DR.

The control circuit 12 comprises: a sampling stage 20, which is coupled to the intermediate node 15 and supplies at output a sampled signal FB, which is the result of sample and hold (for example, performed at each switching cycle) of the feedback voltage $V_{fb}$ at the end of the demagnetization step;

an error-amplifier stage 22, having a first input terminal, which is coupled to the output of the sampling stage 20 and receives the sampled signal FB, a second input terminal, which is coupled to a first reference generator 23 and receives a first reference signal $V_{ref}$, the value of which is a function of a desired value of the regulated output voltage $V_{out}$, and an output terminal, which is coupled to an external compensation network 24 (represented schematically in FIG. 1 by a load impedance). On the output terminal of the error-amplifier stage 22 a control signal $V_{con}$ (a voltage signal) is present.

The control circuit 12 further comprises: a first comparator 27, designed to compare the control signal $V_{con}$ with the sense voltage $V_s$; a driving block 28, which is cascaded with the first comparator 27 and is designed to generate the driving signal DR as a function of the result of the aforesaid comparison (comparison signal drv_off) and of a driving signal drv_on received at input from a clock generator 29.

The voltage converter 1 further comprises a snubber network 30, of a passive type, coupled across the primary winding 5 of the transformer 4. The snubber network 30 comprises a recirculation diode 31, and a clamp resistor 32 coupled in parallel to a clamp capacitor 33 between the first input terminal $IN_1$ of the voltage converter/and the second terminal of the primary winding 5 via the interposition of the recirculation diode 31.

General operation of the voltage converter/illustrated previously is now briefly described.

Due to the absence of an optocoupler between the secondary side of the transformer 4 and the control circuit 12, the value of the output voltage $V_{out}$ is read from the auxiliary winding 7, via the resistive divider 10 upstream of the second rectifier diode 17. In the ideal case of absence of leakage inductances and of parasitic resistances of the transformer 4 and of the wires, and assuming the voltage drop on the first rectifier diode 9 negligible, the auxiliary voltage $V_{aus}$ taken on the auxiliary winding 7 is proportional to the output voltage $V_{out}$ during the period in which, between one switching cycle and the next, the first rectifier diode 9 is in conduction, basically for the entire duration of demagnetization of the transformer 4. In actual fact, on account of the leakage inductances of the transformer and of the equivalent resistance on the secondary winding of the transformer 4, superimposed on the useful signal of the auxiliary voltage $V_{aus}$ is a damped oscillation, which causes the auxiliary voltage $V_{aus}$ to be a faithful replica, but for the turn ratio of the transformer 4, of the output voltage $V_{out}$ only at the instant in which the demagnetization of the transformer 4 is concluded. In fact, in this instant of time the current on the secondary winding is zero, and hence the equivalent resistance on the secondary winding has no effect, and moreover the oscillations due to the leakage inductances have ended (assuming that the demagnetization time is sufficiently long).

The plot of the output signal $V_{out}$ and of the auxiliary voltage $V_{aus}$ is shown in FIG. 2a, in which the demagnetization period is designated by $T_{dem}$. FIG. 2b shows the corresponding plot of the demagnetization current $I_{dem}$, which becomes zero at the end of the demagnetization period $T_{dem}$.

The sampling stage 20 is consequently configured to sample the feedback voltage $V_{fb}$ at the instant of demagnetization of the transformer 4, so that the sampled signal FB coincides, but for the turn ratio of the transformer 4 and the dividing ratio of the resistive divider 10, with the output voltage $V_{out}$.

The difference between the first reference signal $V_{ref}$, which represents the value of the output voltage to be regulated, and the sampled signal FB constitutes the error signal at input to the error-amplifier stage 22. In addition, the control signal $V_{con}$ at output from the error-amplifier stage 22 determines the peak of current on the primary winding, and hence the switching time of the control switch 8 (in PWM mode). In particular, the driving block 28 supplies to the control terminal of the control switch 8 the driving signal DR, and charges the magnetization inductance $L_m$ of the transformer 4 with an energy proportional to the square of the aforesaid peak current.

An operating condition in which the driving signal DR has minimum duty cycle and frequency values is known as "burst-mode condition" (or low-consumption condition). This operating condition arises in the presence of a very low output load. In order to reduce the power consumption of the voltage converter 1, the driving block 28 drives the control switch 8 with a switching frequency much lower than the one used in conditions of normal load and ordinary operation (for example, with a frequency of 1 kHz, instead of 50 kHz). The switching pulses supplied to the control terminal of the control switch 8 are hence spaced further apart in time.

The function of the snubber network 30 is that of limiting the voltage overshoots on the conduction terminal of the control switch 8 coupled to the primary winding of the transformer 4, after its turn-off. The energy that is stored in the leakage inductance $L_{pe}$ during the turn-on phase of the control switch 8 is in fact transferred to and dissipated in the snubber network 30 during the turn-off phase.

One of the limits of the system for regulation of the output voltage $V_{out}$ described above is represented by the fact that, especially in the burst-mode condition, the presence of the snubber network 30 on the primary winding 5 may affect the reading of the output voltage $V_{out}$ and consequently jeopardize regulation of the same output voltage, unless the choice is made to sacrifice the efficiency of the voltage converter 1.

SUMMARY

Embodiments are a voltage converter and a corresponding method for controlling the regulated output voltage, that will enable the aforementioned disadvantages and problems to be overcome at least in part, and in particular that will enable, albeit in the presence of the snubber network, both an adequate regulation of the output voltage and the efficiency of the voltage converter to be preserved.

An embodiment arises from the recognition of a series of problems linked to the voltage converter/described above with reference to the known art. These problems are now illustrated with reference to FIGS. 3a-3c and to FIGS. 4a-4c, which show the pattern of some electrical quantities in the voltage converter 1. In particular, FIGS. 4a-4c show, enlarged, the plots of some of the electrical quantities in the time region highlighted in FIGS. 3a-3c.

In particular, in the normal operating condition (i.e., outside of the burst-mode condition), between one switching cycle and the next, the power dissipated in the clamp resistor 32 of the snubber network 30 is lower than the total power supplied by the transformer 4, which comprises the energy stored in the leakage inductance $L_{pe}$ of the primary winding and in the magnetization inductance $L_m$. Consequently, in the turning-off phase of the control switch 8, the majority of the energy accumulated in the magnetization inductance $L_m$ of the transformer 4 is transferred to the secondary winding, and hence to the load.

Instead, when the voltage converter 1 operates in burst-mode condition, i.e., at low consumption and minimum duty cycle and frequency, the clamp capacitor 33 of the snubber network 30, between one switching and the next, is discharged almost completely, as highlighted in FIG. 3a by the plot of the voltage $V_{clamp}$ across it. Consequently, if the total energy accumulated during turning-on of the control switch 8 in the leakage inductance $L_{pe}$ and magnetization inductance $L_m$ is not sufficient to enable charging of the clamp capacitor 33 at least up to the value of the voltage across the secondary winding 6 reflected on the primary winding of the transformer 4, then the first rectifier diode 9 remains inhibited.

This situation is illustrated in the left-hand box of FIG. 4a, wherein the current $I_{mag}$ that flows in the primary winding 5 during the demagnetization step is equal to the current $I_{clamp}$ that flows in the snubber network 30, whilst the current $I_{sec}$ through the secondary winding is zero. Instead, the right-hand box of FIG. 4a shows a switching cycle wherein the current $I_{sec}$ through the secondary winding is not zero, in so far as the current accumulated in the leakage inductance $L_{pe}$ and magnetization inductance $L_m$ of the primary winding has sufficiently charged the clamp capacitor 33 during the demagnetization period.

At each switching cycle, a minimum energy sufficient in all possible cases for charging the clamp capacitor 33 of the snubber network 30 could be used. However, in certain operating conditions and with a given sizing of the clamp capacitor 33 and of the clamp resistor 32 such that the capacitance of the same clamp capacitor 33 will not be discharged completely, it could happen that part of the energy stored in the primary winding of the transformer 4 is transferred at output, forcing use of a greater dummy load for enabling regulation of the output voltage, therefore potentially impairing the efficiency of the voltage converter.

It follows that at the instant of demagnetization of the transformer 4, the voltage $V_{clamp}$ across the clamp capacitor 33 and the auxiliary voltage $V_{aus}$ taken from the auxiliary winding 7 may not be proportional to the output voltage $V_{out}$, as may be noted from the comparison of the waveforms of the voltage $V_{clamp}/N$, of the auxiliary voltage $V_{aus}$, and of the output voltage $V_{out}$ in FIG. 4b.

In this case, the feedback voltage $V_{fb}$ is (but for the turn ratio and division ratio) lower than the output voltage $V_{out}$, and the control circuit 12 reacts interpreting this situation as an increase of the output load, thus supplying the secondary winding with a power, in actual fact not requested, which causes exit of the voltage converter 1 from the burst-mode condition. The consequent undesirable rise in the output voltage $V_{out}$, detected by the reading of the auxiliary voltage $V_{aus}$, following upon charging of the clamp capacitor 33, sends the voltage converter 1 once again into the burst-mode condition.

These transient periods with groups of switching cycles with entry into and exit from the burst-mode condition, which may be noted from the waveform of the feedback voltage $V_{fb}$ in FIG. 3b, may cause loop oscillator/instability, and thus may cause the loss of regulation of the output voltage $V_{out}$.

As is shown in FIG. 3c, in this operating condition, the output $V_{con}$ of the error-amplifier stage 22, which constitutes the control signal of the peak current on the primary winding, has a number of peaks that determine the excess of power supplied at output. FIG. 4c shows the plot of the driving signal DR at output from the driving block 28.

In addition to the loss of the regulation at low loads, the operation described above with energy peaks that follow one another at sound frequencies, may introduce harmonics that cause problems of electromagnetic interference (EMI) and that may cause the emission of acoustic noise due to phenomena of magnetostriction of the core of the transformer 4 and/or to the piezoelectric effect of the oxide of the clamp capacitor 33 of the snubber network 30.

BRIEF DESCRIPTION OF THE DRAWINGS

Embodiments are now described, purely by way of non-limiting example and with reference to the attached drawings, wherein.

DETAILED DESCRIPTION

An embodiment, in order to provide a correct reading of the feedback voltage, which is correlated to the output voltage, envisages enabling sampling of the feedback voltage $V_{fb}$ only if it is determined that the clamp capacitor 33 of the snubber network 30 has reached the desired charging state (and in particular it is determined that the same capacitor is charged to the value of the output voltage $V_{out}$ reflected on the primary winding of the transformer 4). Another embodiment envisages, when it is determined that the clamp capacitor 33 of the snubber network 30 is not charged to the desired value, controlling the switching of the switch 8 so as to charge the same clamp capacitor 33 before carrying out the sampling operation.

Figure 5:
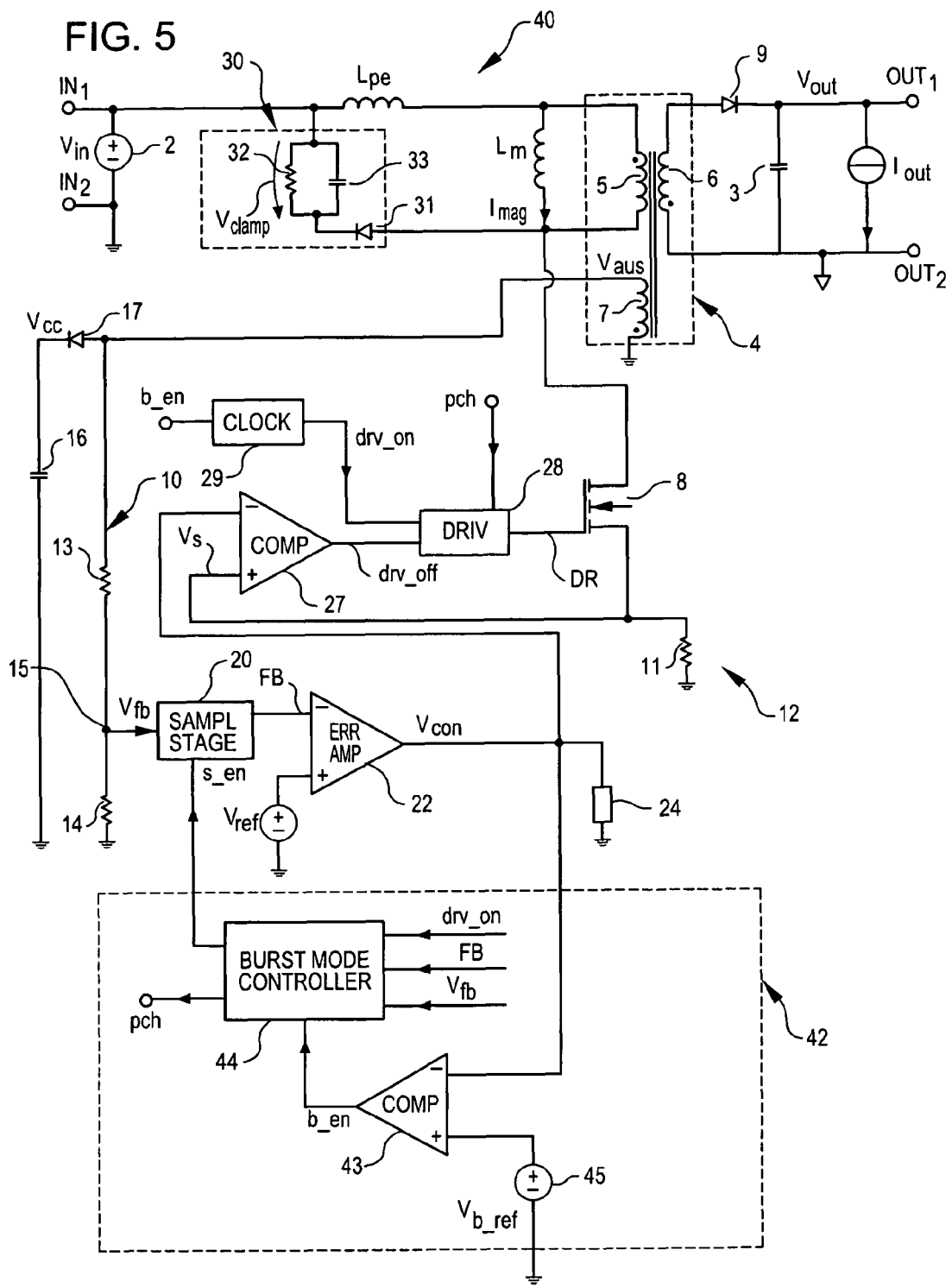
FIG. 5 shows a circuit diagram of a voltage converter according to an embodiment.

FIG. 5 shows the circuit diagram of a voltage converter 40, made according to one embodiment. Elements that are similar to the ones described previously are designated by the same reference numbers, and are not described again in detail.

Figure 1:
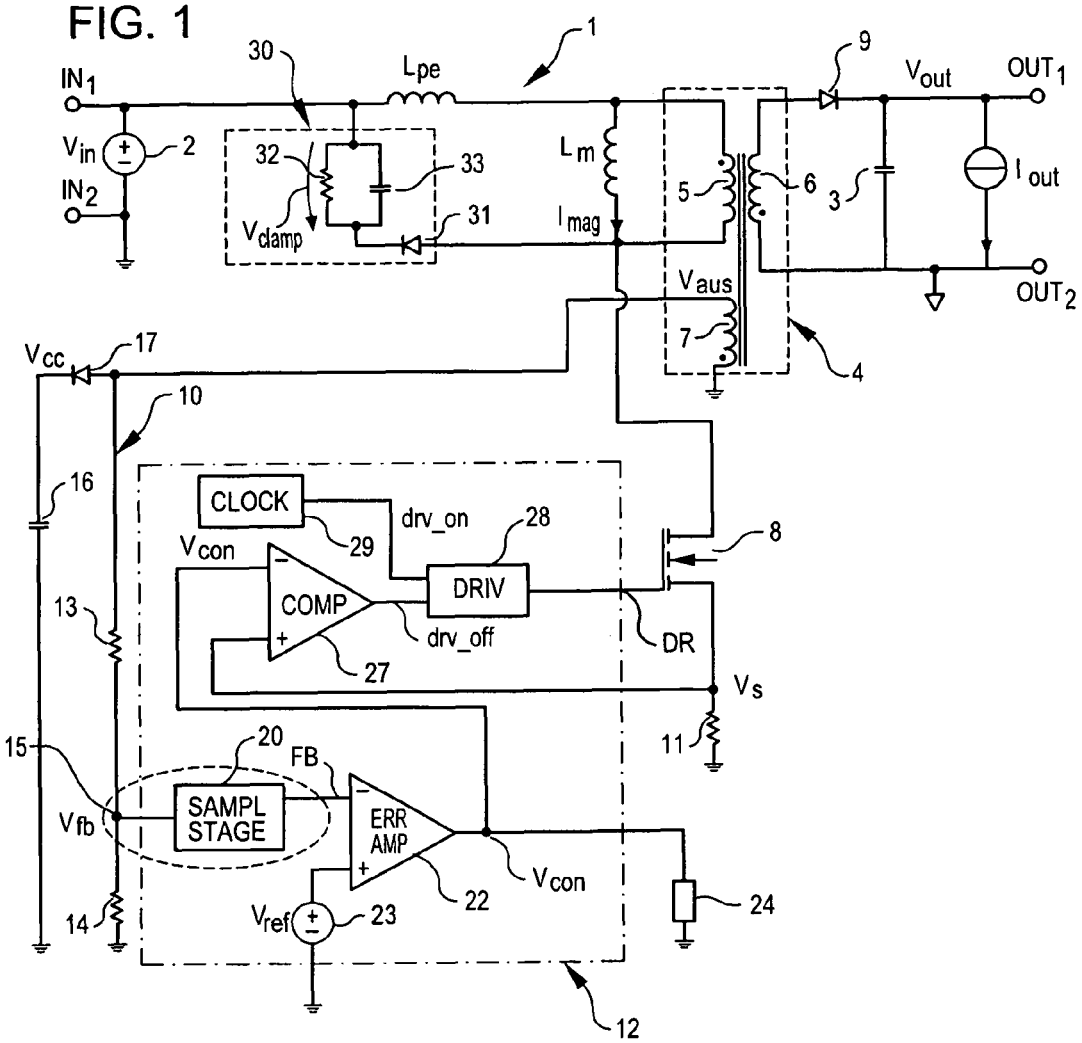
FIG. 1 shows a circuit diagram of a voltage converter of a known type.
Figure 2A:
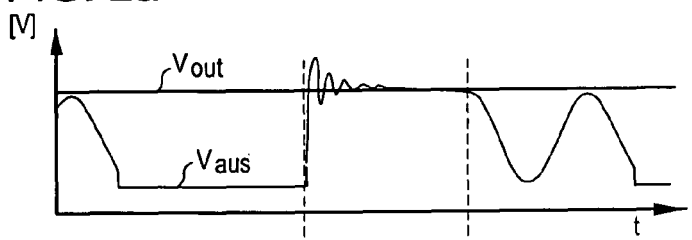
FIGS. 2a, 2b, 3a-3c and 4a-4c show plots of some electrical quantities in the voltage converter of FIG. 1.
Figure 2B:
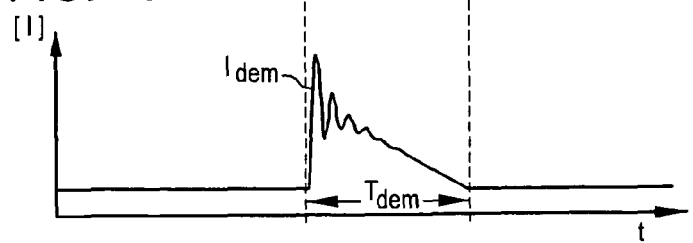
Figure 3A:
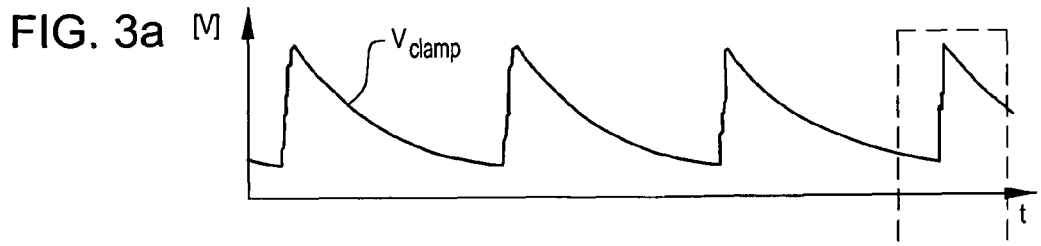
Figure 3B:
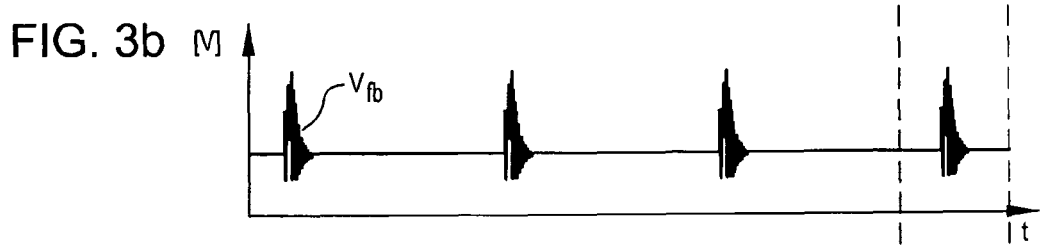
Figure 3C:
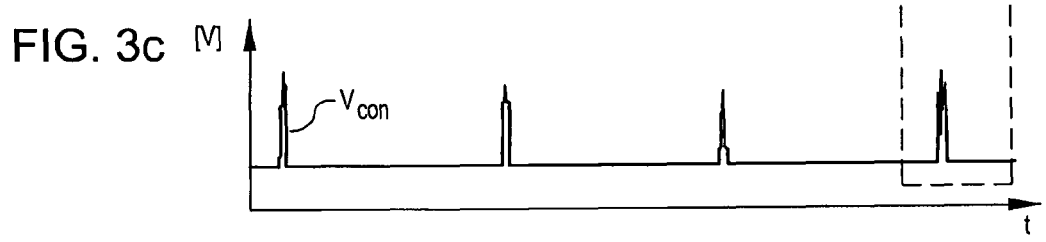
Figure 4A:
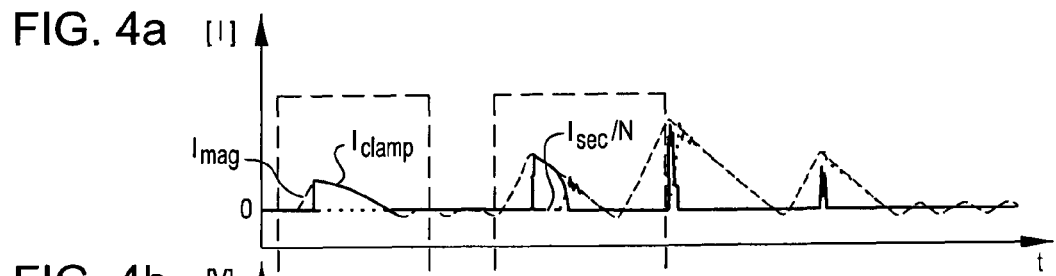
Figure 4B:
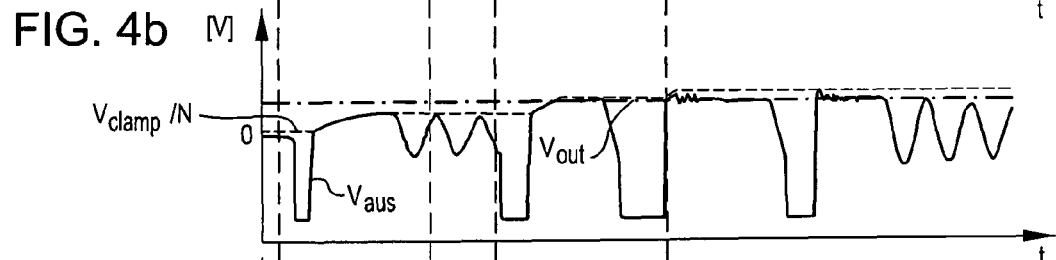
Figure 4C:
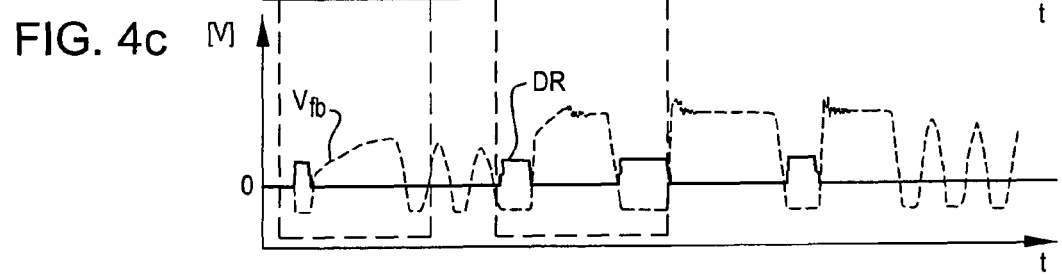

In particular, this circuit diagram differs from that of the voltage converter 1 shown in FIG. 1, substantially for the presence of a burst-mode control stage 42, which is designed to control operation of the voltage converter/during a burst-mode condition and at exit from the same burst-mode condition, and comprises a second comparator 43 and a burst-mode controller 44.

The second comparator 43 has a first input, which is coupled to the output of the error-amplifier stage 22 and receives the control signal $V_{con}$, a second input, which is coupled to a second reference generator 45 and receives a second reference signal $V_{b\_ref}$, and an output, which is coupled to the burst-mode controller 44 and to the clock generator 29 and supplies a burst-mode-enable signal b_en.

The burst-mode controller 44 has: a first input, which is coupled to the intermediate node 15 and receives the feedback voltage $V_{fb}$; a second input, which is coupled to the output of the sampling stage 20 and receives the sampled signal FB; a third input, which is coupled to the output of the clock generator 29 and receives the driving signal drv_on; a fourth input, which is coupled to the output of the second comparator 43 and receives the burst-mode-enable signal b_en; a first output, which is coupled to the sampling stage 20 and supplies a sampling-enable signal s_en; and a second output, which is coupled to the driving block 28 and supplies a pre-charging signal pch.

There now follows a description of the general operation of the burst-mode control stage 42.

The static characteristic of the control voltage $V_{con}$ as a function of the charge current $I_{out}$ is such that, as one decreases also the other decreases, in such a way that also the peak current at the primary winding of the transformer 4 will decrease. In low-load conditions, the peak current requested at the primary has a reduced value, and the control voltage $V_{con}$ drops below the second reference signal $V_{b\_ref}$, corresponding to a pre-set output power (indicative of a condition of normal operation of the voltage converter 1). The second comparator 43 detects this condition and, by means of the burst-mode-enable signal b_en (which goes to the high value), forces the voltage converter 40 to work in a condition of low consumption, i.e., at a pre-set frequency that is chosen sufficiently low as to reduce the power dissipated in stand-by mode. In particular, the burst-mode-enable signal b_en controls the clock generator 29 so that the driving signal drv_on has a low frequency (for example, equal to 1 kHz) and a reduced duty cycle.

In this condition, the burst-mode controller 44 takes control of the sampling stage 20, enabling, or not, updating of the sampled signal FB. In particular, the decision of updating the sampled signal FB is taken on the basis of the current value of the feedback voltage $V_{fb}$ and of the previous value of the sampled signal FB. In addition, as will be described in detail hereinafter, when it is determined that during the demagnetization phase the clamp capacitor 33 is not sufficiently charged, the burst-mode controller 44 controls the driving block 28 in such a way that it will send a series of pre-charging switching pulses to the control terminal of the control switch 8, in order to charge the clamp capacitor 33, irrespective of the timing of the driving signal drv_on.

Figure 6:
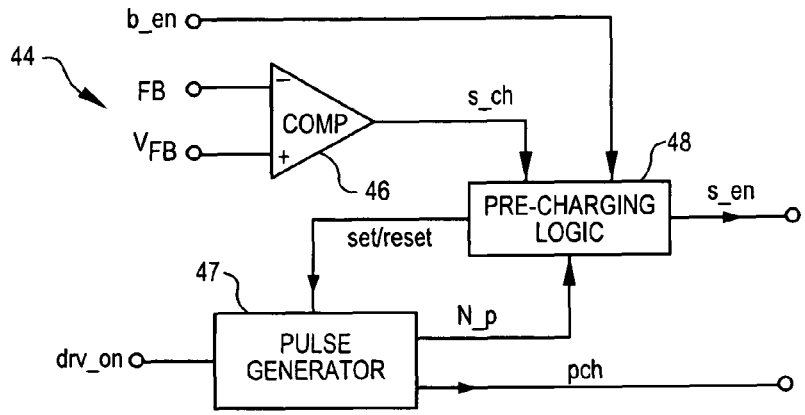
FIG. 6 shows a block diagram of an embodiment of a burst-mode control stage in the voltage converter of FIG. 5.

In greater detail, and as is shown in FIG. 6, the burst-mode controller 44 comprises a third comparator 46, a pre-charging pulse generator 47, and a pre-charging logic 48.

The third comparator 46 receives at input the sampled signal FB (with the value sampled at the previous switching cycle) and the current value of the feedback voltage $V_{fb}$, and supplies at output a state-of-charge signal s_ch, indicating the state of charge of the clamp capacitor 33. The pre-charging pulse generator 47 receives at its input the driving signal drv_on, and a set/reset control signal from the pre-charging logic 48, generates the pre-charging signal pch (for example, made of a series of pulses) starting from the driving signal drv_on, and supplies at its output the pre-charging signal pch and a count signal N_p. The pre-charging logic 48 receives at its input the state-of-charge signal s_ch and the burst-mode-enable signal b_en, and supplies at its output, in addition to the set/reset control signal, the sampling-enable signal s_en.

In use, after entry into the burst-mode condition (the burst-mode-enable signal b_en has gone to the high value), at each switching cycle set by the timing of the pre-charging signal pch, the third comparator 46 compares, for the entire duration of the demagnetization phase of the transformer 4, the sampled signal FB, held in the sampling stage 20 and updated at the switching cycle preceding the current one, with the current value of the feedback voltage $V_{fb}$.

Assuming a stationary operation of the voltage converter 40, a value of the feedback voltage $V_{fb}$ greater than or equal to that of the sampled signal FB indicates that the clamp capacitor 33 has been sufficiently charged, and the voltage $V_{clamp}$ across the clamp capacitor 33 is equal to the output voltage $V_{out}$ reflected on the primary winding of the transformer 4, i.e., indicates that the first rectifier diode 9 is in conduction and across the auxiliary winding 7 there is the reflection of the output voltage $V_{out}$. Consequently, the pre-charging logic 48 issues a command for updating of the sampled signal FB, asserting the sampling-enable signal s_en high.

Instead, when during the demagnetization phase the clamp capacitor 33 is not charged to its final value, the feedback voltage $V_{fb}$ is lower than the sampled signal FB. In this circumstance, the pre-charging logic 48 enables, with the assertion of the set/reset control signal high, the pre-charging pulse generator 47 to force a series of pre-charging switching cycles at fixed energy and frequency (for example with a frequency of 150 kHz and an energy of 6 µJ per cycle), until, during the demagnetization phase of the last of the switching cycles performed, the third comparator 46 detects that the feedback voltage $V_{fb}$ has exceeded the value of the sampled signal FB so that sampling is once again enabled.

In addition, given that a sudden increase in the output load current could determine a lowering in the output voltage $V_{out}$ and in the voltage reflected on the auxiliary winding 7, with the consequence of not enabling updating of the sampled signal FB (in so far as the condition $V_{fb}$>FB would not arise) and of sending the voltage converter out of regulation, a maximum upper limit of pre-charging switching cycles is established. If, at the end of the pre-charging switching cycles envisaged (determined by the value of the end-of-count signal N_p, indicating the number of switching cycles performed), the feedback voltage $V_{fb}$ were to be still lower than the value of the sampled signal FB, the pre-charging logic 48 would determine in any case updating of the sampled signal FB (asserting the enable signal s_en high), enabling the control circuit 12 of the voltage converter 1 to re-assume control of the output voltage $V_{out}$.

Figure 7:
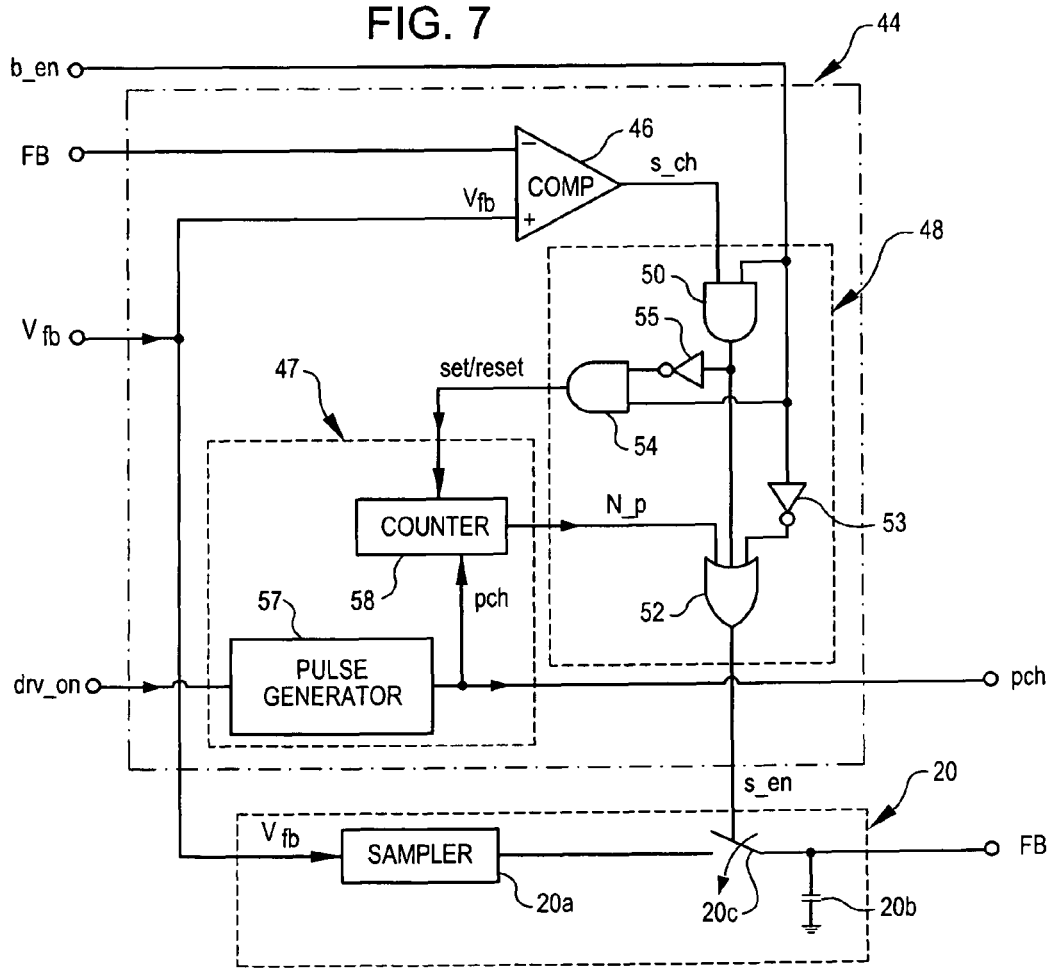
FIG. 7 shows a possible circuit embodiment of the burst-mode control stage of FIG. 6.
Figure 8A:
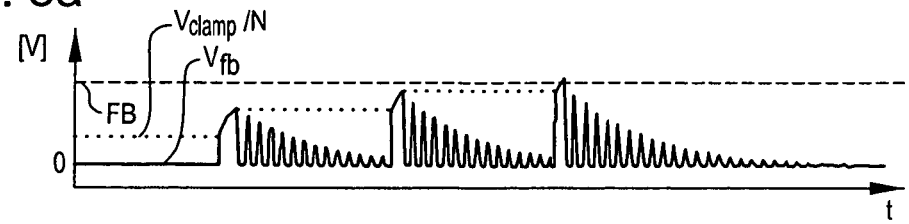
FIGS. 8a-8d show plots of some electrical quantities in the voltage converter of FIG. 5.
Figure 8B:
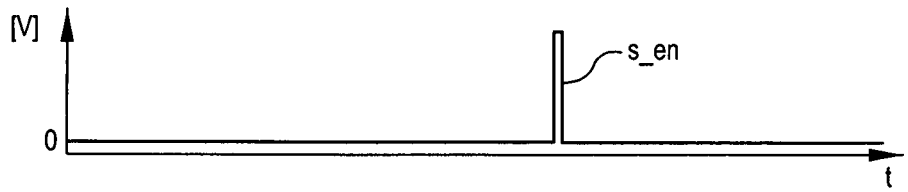
Figure 8C:
Figure 8D:
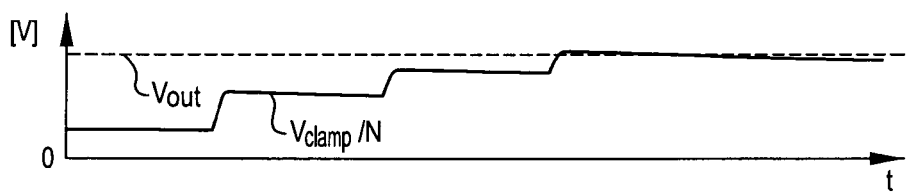

In a possible circuit embodiment, shown in FIG. 7, the pre-charging logic 48 comprises: a first AND logic gate 50, with two inputs, receiving the state-of-charge signal s_ch and the burst-mode-enable signal b_en; a first OR logic gate 52, with three inputs, which receives the logic signal at output from the first AND logic gate 50, the complementary of the burst-mode-enable signal b_en from a first logic inverter 53, and the end-of-count signal N_p, and supplies at output the sampling-enable signal s_en for the sampling stage 20; a second AND logic gate 54, with two inputs, which receives, from a second inverter 55, the complementary of the logic signal at output from the first AND logic gate 50, and the burst-mode-enable signal b_en, and supplies at output the set/reset control signal for the pre-charging pulse generator 47.

In particular, the sampling stage 20 comprises: a sampling block 20a receiving the feedback voltage $V_{fb}$; a holding capacitor 20b, across which the sampled signal FB is present; and a sampling switch 20c, set between the sampling block 20a and the holding capacitor 20b. The sampling-enable signal s_en controls the sampling switch 20c, and enables connection of the holding capacitor 20b to the output of the sampling block 20a so as to enable updating of the value of the sampled signal FB.

The pre-charging pulse generator 47 comprises: a pulse-generation block 57, which generates at output, as a function of the driving signal drv_on, the pre-charging signal pch; and a counter block 58, which is coupled to the output of the pulse-generation block 57, is designed to count the number of pulses generated and supplies at its output the end-of-count signal N_p at the end of count.

In use, the pre-charging logic 48 enables updating of the value of the sampled signal FB (setting the sampling-enable signal s_en to the high value) when at least one of the following conditions arises:

the state-of-charge signal s_ch switches to the high value, because the feedback voltage $V_{fb}$ has exceeded the sampled signal FB; this event also determines resetting of the counter block 58 (the count drops to zero) and of the pulse-generation block 57 (the generation of the pre-charge pulses is stopped) by means of the set/reset control signal;

the end-of-count signal N_p switches to the high value because the counter block 58 has counted a pre-set number of switching cycles starting from the first switching cycle immediately subsequent to the entry into the burst-mode condition; and the burst-mode-enable signal b_en has a low value, indicating a normal condition of operation of the voltage converter 40 (in which the burst-mode control stage 42 does not affect the sampling operation).

FIGS. 8a-8d show plots of the signals involved in the operation of the burst-mode control stage 42. For simplicity of illustration, the auxiliary voltage $V_{aus}$ is assumed equal to the feedback voltage $V_{fb}$. As may be noted, thanks to the pre-charging pulses (supplied by the driving block 28 as a function of the pre-charging signal pch), the clamp capacitor 33 is charged progressively, and the value of the voltage $V_{clamp}$ across it increases until it reaches the value of the output voltage $V_{out}$, reflected on the primary winding of the transformer 4. During charging of the clamp capacitor 33, the feedback voltage $V_{fb}$ basically follows the behavior of the voltage $V_{clamp}$. As soon as the feedback voltage $V_{fb}$ exceeds the value of the sampled signal FB, the sampling-enable signal s_en switches to the high value, enabling updating of the sampled signal FB and allowing proper regulation of the output voltage $V_{out}$.

It may happen that, in certain load conditions, intermediate between the burst-mode condition and a condition of normal operation, the system will work alternatively in burst-mode condition or out of the burst-mode condition, and that the control signal $V_{con}$ will thus cross repeatedly (upwards or downwards) the second reference signal $V_{b\_ref}$. In these operating conditions, when the system is in the burst-mode condition, the clamp capacitor 33 will discharge in any case, and hence, at exit from the burst-mode condition, it will be necessary to verify its state of charge, in order to prevent an erroneous sampling of the feedback voltage $V_{fb}$.

Consequently, another embodiment envisages implementation of the logic for controlling the sampling stage 20 described above also at exit from the burst-mode condition, until the correct state of charge of the clamp capacitor 33 is detected, or else the envisaged maximum number of pre-charging cycles is exceeded.

Figure 9:
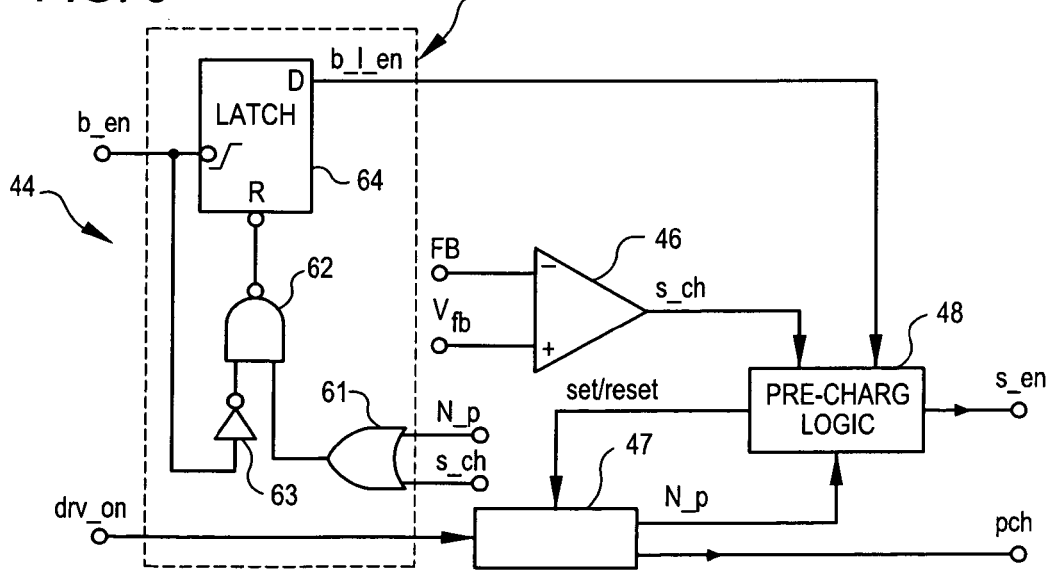
FIG. 9 shows a block diagram of a variant of the burst-mode control stage of the voltage converter of FIG. 5.
Figure 10A:
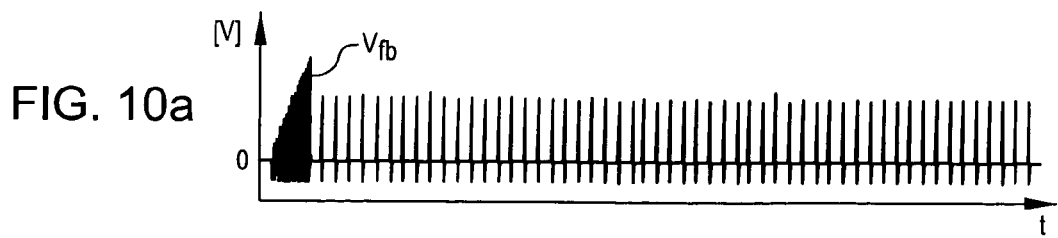
FIGS. 10a-10c and 11a-11c show the comparative evolution between some electrical quantities in the voltage converter of FIG. 1 and, respectively, corresponding electrical quantities in the voltage converter of FIG. 5.
Figure 10B:
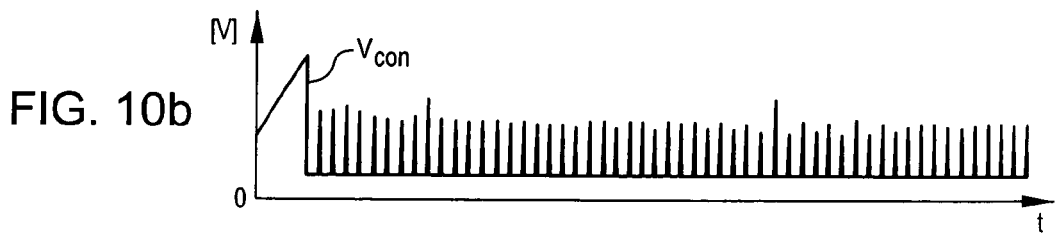
Figure 10C:
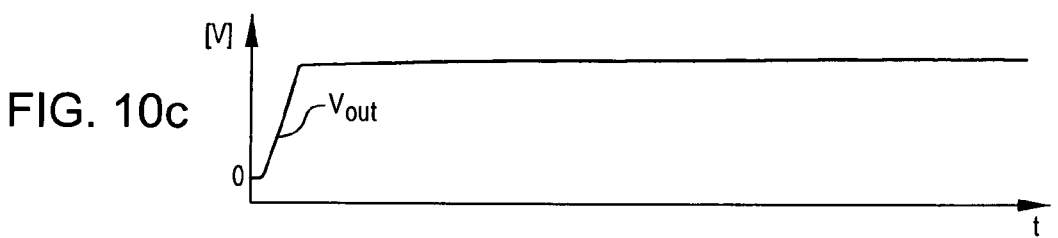
Figure 11A:
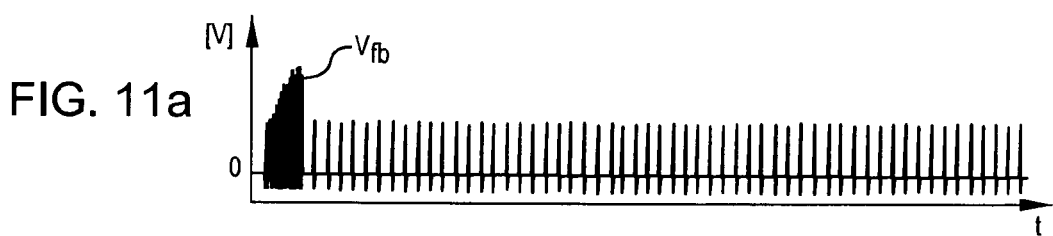
Figure 11B:
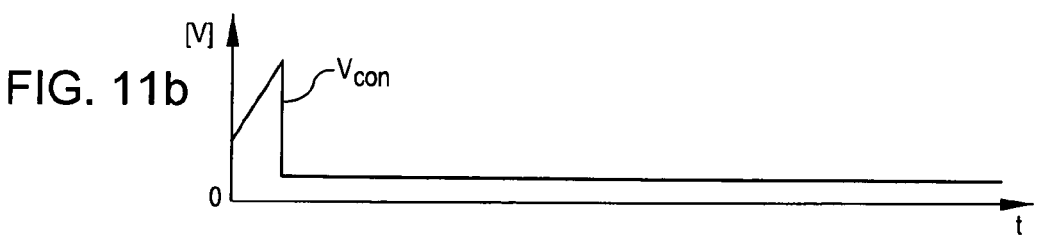
Figure 11C:
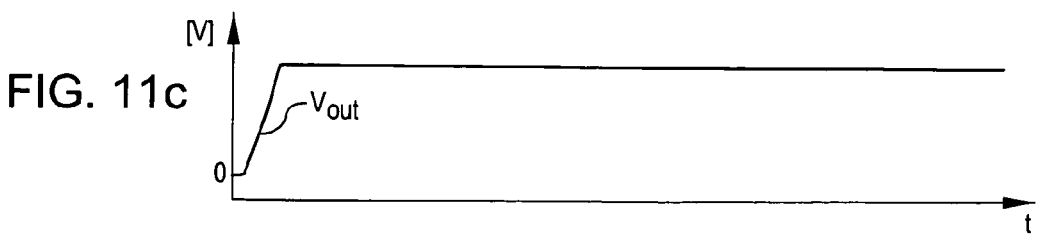

For this purpose, as is shown in FIG. 9, the burst-mode controller 44 further comprises a hold stage 60, which receives at input the burst-mode-enable signal b_en, the count signal N_p and the state-of-charge signal s_ch, and supplies at output for the pre-charging logic 48 a hold signal b_1_en, which is a function of the burst-mode-enable signal b_en (and replaces the same burst-mode-enable signal b_en).

In detail, the hold stage 60 comprises: a second OR logic gate 61, which receives at input the state-of-charge signal s_ch and the count signal N_p; a NAND logic gate 62, which receives the output of the second OR logic gate 61 and the complementary of the burst-mode-enable signal b_en from a third logic inverter 63; and a latch logic block 64 having a signal input, which receives the burst-mode-enable signal b_en, a reset input, which receives the output of the NAND logic gate 62, and an output, which supplies the hold signal b_1_en.

In this case, the burst-mode-enable signal b_en is stored by the latch logic block 64 and held at output until one of the two conditions necessary for updating the sampled signal FB arises, i.e., until the state-of-charge signal s_ch or the count signal N_p assumes a high value; in this way, it is possible to enable, by means of the hold signal b_1_en, the pre-charging logic 48 even after exit of the voltage converter 40 from the burst-mode condition.

The embodiments of the voltage converter described, and the corresponding control methods, may have a number of advantages.

In particular, one or more embodiments enable use of a passive snubber network without jeopardizing regulation of the output voltage $V_{out}$ of the voltage converter 40, and prevent peaks of energy supplied at output (and the associated problems of EMI and of emission of acoustic noise). These advantages are obtained with limited circuit modifications, without entailing a substantial increase in the final area occupation of the device and of the associated production costs.

The effectiveness of regulation of the output voltage $V_{out}$ of the voltage converter 40 according to an embodiment emerges clearly from FIGS. 10a-10c and 11a-11c, which illustrate the performance of a voltage converter 1 of a traditional type and, respectively, of the voltage converter 40 (with an output load current of 1 mA). In particular, it may be noted that the voltage converter 40 enables a better regulation of the output voltage $V_{out}$ to be obtained, in the absence of energy peaks on the control signal $V_{con}$.

The use of an embodiment of the voltage converter 40 may be particularly advantageous in a battery-charger device, for supplying a regulated output voltage (for example, equal to 12 V) starting from the mains voltage.

Finally, it is clear that modifications and variations may be made to what is described and illustrated herein, without thereby departing from the scope of the present disclosure.

In particular, the burst-mode control stage 42 may be present also in the case where a Zener diode is used instead of the clamp capacitor 33 and of the clamp resistor 32 in the snubber network 30. Given that the Zener diode becomes conductive with a very small current, generally a pre-charging step is not necessary. In this case, the burst-mode control stage 42 would become "transparent", without altering operation of the voltage converter.

In addition, the feedback voltage $V_{fb}$, correlated to the value of the output voltage $V_{out}$, may be taken, in the voltage converter 40, directly from the primary winding 5 on the primary side of the transformer 4. In this case, the auxiliary winding 7 might not being provided, or else it might be used only for providing the self-supply for the control circuit 12' (the control method described remaining, however, unchanged).

One or more embodiments may find generic application in voltage converters of a switching type with feedback on the primary winding and with control of the peak current, it being hence independent of: the particular type of converter (or regulator or power supply) used (even though in the description particular reference has been made to the flyback type); the modalities of energy transfer between supply source and load, at a fixed or variable frequency; the particular circuit solution used for implementing the functionality of the individual blocks of the control logic; the type of the control switch; and the feedback mode envisaged on the primary side of the transformer.

Furthermore, in an embodiment, all the components of the regulated power supply 40 in FIG. 5 other than the input supply 2, snubber 30, transformer 4, diode 9, capacitor 3, load $I_{out}$, diode 17, capacitor 16, compensation 24, resistor 11, and transistor 8 may be disposed on a regulator integrated circuit (IC), although one or more of the aforementioned components may be disposed on the regulator IC. Furthermore, the load may be another circuit (e.g., a processor or memory) that may be disposed on the save IC as the regulator or on a different IC.

Naturally, in order to satisfy local and specific requirements, a person skilled in the art may apply to the solution described above many modifications and alterations. Particularly, although the present disclosure has been described with a certain degree of particularity with reference to described embodiment(s) thereof, it should be understood that various omissions, substitutions and changes in the form and details as well as other embodiments are possible. Moreover, it is expressly intended that specific elements and/or method steps described in connection with any disclosed embodiment may be incorporated in any other embodiment as a general matter of design choice.

What is claimed is:

1. A voltage converter, comprising:
   a voltage transformer having a primary winding, designed to receive an input voltage, and a secondary winding, designed to supply an output voltage;
   a control switch coupled to said primary winding;
   a control circuit, designed to control switching of said control switch, said control circuit having a sampling stage, designed to sample and hold a feedback signal correlated to said output voltage and to supply a sampled signal;
   a voltage limiting circuit, provided with a charge storage circuit designed to be connected across said primary winding; and
   a sampling control stage, operatively coupled to said sampling stage and designed, during a given operating condition of said voltage converter, to enable updating of said sampled signal on the basis of a state of charge of said charge-storage circuit.

2. The converter according to claim 1, wherein said voltage transformer have a primary side on which said primary winding is set, a secondary side on which said secondary winding is set, and an auxiliary winding, set on said primary side and designed to supply said feedback signal.

3. The converter according to claim 1, wherein said control circuit is designed to control said control switch with a first switching frequency in a first condition of operation of said voltage converter; said given operating condition corresponding to a condition of low consumption in which said control circuit is designed to control said control switch with a second switching frequency, lower than said first switching frequency.

4. The converter according to claim 1, wherein said sampling control stage is designed to enable said updating, as a function of the value of said feedback signal.

5. The converter according to claim 4, wherein said sampling control stage comprises: a comparator stage, designed to compare a current value of said feedback signal with a previous value of said sampled signal; and a control logic, connected to said comparator stage, designed to enable updating of said sampled signal in the case where said current value of said feedback signal has a first relation of comparison with said previous value of said sampled signal.

6. The converter according to claim 5, wherein said current value is assumed by said feedback signal during a current switching cycle, and said previous value is assumed by said sampled signal during a switching cycle preceding said current switching cycle; and wherein said first relation of comparison is satisfied when said current value of said feedback signal is higher than said preceding value of said sampled signal.

7. The converter according to claim 1, wherein said sampling-control stage comprises a charge block, configured to generate a charge signal, designed to control switching of said control switch for causing charging of said charge storage circuit.

8. The converter according to claim 7, wherein said charge block is designed to supply said charge signal to a control terminal of said control switch, in the case where a current value of said feedback signal has a second relation of comparison with a previous value of said sampled signal.

9. The converter according to claim 8, wherein said charge signal is made of a series of pulses; and wherein said sampling control stage comprises: a comparator stage, designed to compare said current value of said feedback signal with said previous value of said sampled signal; and a control logic, designed to stop generation of said charge signal when said current value of said feedback signal does not have said second relation of comparison with said previous value of said sampled signal, or else after generation of a pre-set number of pulses of said charge signal.

10. The converter according to claim 1, wherein said sampling control stage comprises: a controller configured to enable said updating of said sampled signal; and a detection block configured to detect the occurrence of said given operating condition of said voltage converter and consequently to supply an enable signal to said controller such as to enable operation thereof.

11. The converter according to claim 10, wherein said control circuit further comprises an error amplifier stage, designed to amplify a difference between said sampled signal and a first reference signal and to supply at output a control signal; said detection block comprising comparator means, designed to make a comparison between said control signal and a second reference signal and to generate at output said enable signal as a function of the result of said comparison.

12. The converter according to claim 1, wherein said sampling control stage is configured to enable said updating on the basis of a voltage across said charge-storage means; said sampling control stage being designed to enable said updating also at exit from said given operating condition of said voltage converter.

13. The converter according to claim 12, wherein said sampling control stage comprises: a controller configured to enable said updating of said sampled signal; a detection block configured to detect the occurrence of said given operating condition of said voltage converter and consequently to supply an enable signal to said controller such as to enable operation thereof; and a hold block, connected to the output of said detection block and designed to hold a value of said enable signal at exit from said given operating condition of said voltage converter until said voltage across said charge storage circuit assumes a desired value.

14. The converter according to claim 1, of an isolated type, wherein said control circuit is further configured to implement a PWM control of said control switch, for controlling a peak current in said primary winding based on the value of said sampled signal.

15. A method for controlling a voltage converter, said voltage converter being provided with:

a voltage transformer having a primary winding, designed to receive an input voltage and a secondary winding, designed to supply an output voltage;

a control switch coupled to said primary winding; and a voltage limiting circuit, provided with a charge storage circuit designed to be connected across said primary winding; said method comprising:

controlling switching of said control switch as a function of a feedback signal correlated to said output voltage, wherein the controlling comprises sampling and holding said feedback signal for generating a sampled signal, and during a given operating condition of said voltage converter, enabling updating of said sampled signal on the basis of a state of charge of said charge storage circuit.

16. The method according to claim 15, wherein controlling comprises driving said control switch with a first switching frequency in a first condition of operation of said voltage converter; said given operating condition corresponding to a condition of low consumption in which said control switch is controlled with a second switching frequency, lower than said first switching frequency.

17. The method according to claim 15, wherein enabling comprises enabling said updating as a function of the value of said feedback signal.

18. The method according to claim 17, wherein enabling comprises comparing a current value of said feedback signal with a previous value of said sampled signal, and enabling updating of said sampled signal in the case where said current value of said feedback signal has a first relation of comparison with said previous value of said sampled signal.

19. The method according to claim 18, wherein said current value is assumed by said feedback signal during a current switching cycle, and said previous value is assumed by said sampled signal during a switching cycle preceding said current switching cycle; and wherein said first relation of comparison is satisfied when said current value of said feedback signal is higher than said preceding value of said sampled signal.

20. The method according to claim 15, further comprising generating a charge signal, designed to control switching of said control switch to bring about charging of said charge storage circuit.

21. The method according to claim 20, wherein charging comprises supplying said charge signal to a control terminal of said control-switch in the case where a current value of said feedback signal has a second relation of comparison with a previous value of said sampled signal.

22. The method according to claim 21, wherein said charge signal is made of a series of pulses; and wherein charging comprises stopping generation of said charge signal in the case where a current value of said feedback signal does not have said second relation of comparison with said previous value of said sampled signal, or else after generation of a pre-set number of pulses of said charge signal during said step of charging.

23. The method according to claim 15, further comprising detecting the occurrence of said given operating condition of said voltage converter, and carrying out said step of enabling said updating, on the basis of said detection.

24. The method according to claim 23, wherein controlling further comprises amplifying a difference between said sampled signal and a first reference signal to supply a control signal;

detecting comprising making a comparison between said control signal and a second reference signal, and detecting the occurrence of said given operating condition of said voltage converter as a function of the result of said comparison.

25. The method according to claim 15, wherein enabling comprises enabling said updating on the basis of a voltage across said charge storage circuit; enabling said updating being carried out also at exit from said given operating condition of said voltage converter, until said voltage across said charge storage circuit assumes a desired value.

26. A regulator circuit, comprising:

a feedback circuit configured to generate a first feedback signal that is related to a regulated signal;

an amplifier coupled to the feedback circuit and configured to generate a control signal that is related to a difference between the first feedback signal and a first reference signal;

a driver coupled to the amplifier and configured to generate from the control signal a drive signal that is configured to cause the regulated signal to be generated; and a feedback controller configured to disable the feedback circuit in response to an occurrence of a condition.

27. The regulator circuit of claim 26 wherein the regulated signal comprises a regulated voltage.

28. The regulator circuit of claim 26 wherein:

the feedback circuit comprises a sampler configured to generate a sample of a second feedback signal that is related to the regulated signal and to generate the first feedback signal from the sample; and the feedback controller is configured to disable the feedback circuit by prohibiting the feedback circuit from updating the first feedback signal.

29. The regulator circuit of claim 26 wherein:

the feedback circuit is configured to generate the first feedback signal from a second feedback signal that is related to the regulated signal; and if the control signal has a first relationship to a second reference signal and if the first feedback has a second relationship to the second feedback signal, then the feedback controller is configured to disable the feedback circuit by prohibiting the feedback circuit from updating the first feedback signal.

30. The regulator circuit of claim 26 wherein:

the control signal has the first relationship to the second reference signal when an absolute value of the control signal is less than an absolute value of the second reference signal; and the first feedback signal has the second relationship to the second feedback signal if an absolute value of the first feedback signal is greater than an absolute value of the second feedback signal.

31. The regulator circuit of claim 26, wherein:

the feedback circuit is configured to generate the first feedback signal from a second feedback signal that is related to the regulated signal; and if the control signal has a first relationship to a second reference signal and if the first feedback signal has a second relationship to the second feedback signal, then the feedback controller is configured to disable the feedback circuit by prohibiting the feedback circuit from updating the first feedback signal and is configured to cause the drive circuit to generate the drive signal until the first feedback signal does not have the second relationship to the second feedback signal.

32. The regulator circuit of claim 26, wherein:

the feedback circuit is configured to generate the first feedback signal from a second feedback signal that is related to the regulated signal; and if the control signal has a first relationship to a second reference signal and if the first feedback signal has a second relationship to the second feedback signal, then the feedback controller is configured to cause the drive circuit to generate the drive signal for a number of times and is configured to disable the feedback circuit by prohibiting the feedback circuit from updating the first feedback signal until the drive circuit has generated the drive signal for the number of times.

33. The regulator circuit of claim 26, wherein:
the feedback circuit is configured to generate the first feedback signal from a second feedback signal that is related to the regulated signal; and
if the control signal has a first relationship to a second reference signal and if the first feedback signal has a second relationship to the second feedback signal, then he feedback controller is configured to cause the drive circuit to generate the drive signal up to a maximum number of times and is configured to disable the feedback circuit by prohibiting the feedback circuit from updating the first feedback signal until the first feedback signal does not have the second relationship to the second feedback signal or until the drive circuit has generated the drive signal the maximum number of times.

34. A power supply, comprising:
an output node configured to provide a regulated voltage;
primary and secondary reference nodes;
an input node configured to receive an input voltage;
a transformer having a first primary tap coupled to the input node, a second primary tap, a third primary tap, a fourth primary tap coupled to the primary reference node, a first secondary tap coupled to the output node, and a second secondary tap coupled to the second reference node;
a switch having a first conduction node coupled to the second primary tap, a second conduction node coupled to the primary reference node, and a control node;
a capacitor disposed across the first and second primary taps; and
a regulator circuit, comprising
 a feedback circuit coupled to the third primary tap and configured to generate a feedback signal that is related to the regulated voltage,
 an amplifier coupled to the feedback circuit and configured to generate a control signal that is related to a difference between the feedback signal and a reference signal,
 a driver coupled to the amplifier and configured to generate from the control signal a drive signal on the control node of the switch, and
 a feedback controller configured to disable the feedback circuit during an operating mode in response to an occurrence of a condition of the capacitor.

35. The power supply of claim 34 wherein the regulator circuit is disposed on an integrated circuit.

36. The power supply of claim 34 wherein the regulator circuit and the switch are disposed on an integrated circuit.

37. The power supply of claim 34, further comprising a voltage divider disposed between the third primary tap and the feedback circuit.

38. The power supply of claim 34, further comprising:
a sense element coupled between the second conduction node of the switch and the secondary reference node and configured to generate a sense signal; and
wherein the driver is coupled to the sense element and is configured to generate the drive signal related to a difference between the control signal and the sense signal.

39. The power supply of claim 34 wherein:
the sense element comprises a sense resistor; and
the sense signal comprises a sense voltage.

40. The power supply of claim 34, further comprising:
a diode coupled to the third primary tap; and
a capacitor coupled between the diode and the secondary reference node.

41. The power supply of claim 34, further comprising a diode coupled between the first secondary tap and the output node.

42. The power supply of claim 34 wherein the transformer further comprises:
 a primary winding disposed between the first and second primary taps;
 an auxiliary winding disposed between the third and fourth primary taps; and
 a secondary winding disposed between the first and second secondary taps.

43. The power supply of claim 34 wherein the feedback controller is configured to generate the feedback signal as a feedback voltage and to prohibit the feedback circuit from updating the feedback voltage during a low-power mode in response to an absolute value of a voltage across the capacitor being lower than an absolute value of the feedback voltage.

44. A system, comprising:
a power supply, comprising
an output node configured to provide a regulated voltage,
primary and secondary reference nodes,
an input node configured to receive an input voltage,
a transformer having a first primary tap coupled to the input node, a second primary tap, a third primary tap, a fourth primary tap coupled to the primary reference node, a first secondary tap coupled to the output node, and a second secondary tap coupled to the second reference node,
a switch having a first conduction node coupled to the second primary tap, a second conduction node coupled to the primary reference node, and a control node,
a capacitor disposed across the first and second primary taps, and
a regulator circuit, comprising
feedback circuit coupled to the third primary tap and configured to generate a feedback signal that is related to the regulated voltage,
an amplifier coupled to the feedback circuit and configured to generate a control signal that is related to a difference between the feedback signal and a reference signal,
a driver coupled to the amplifier and configured to generate from the control signal a drive signal on the control node of the switch, and
a feedback controller configured to disable the feedback circuit during a operating mode in response to an occurrence of a condition of the capacitor; and
a load coupled between the output node and the secondary reference node.

45. The system of claim 44 wherein the regulator circuit and the load are disposed on respective integrated circuits.

46. The system of claim 44 wherein the regulator circuit and the load are disposed on a same integrated circuit.

47. A method, comprising:
generating a first feedback signal that is related to a regulated signal;
generating a second feedback signal from the first feedback signal;
generating the regulated signal in response to the second feedback signal;
comparing the first feedback signal to the second feedback signal; maintaining the second feedback signal at a substantially constant value in response to the second feedback signal having a first relationship to the first feedback signal; and allowing the second feedback signal to change in response to the second feedback signal having a second relationship to the first feedback signal.

48. The method of claim 47 wherein generating the first feedback signal comprises generating the first feedback signal equal to a fraction of the regulated signal.

49. The method of claim 47 wherein generating the second feedback signal comprises generating the second feedback signal equal to a sample of the first feedback signal.

50. The method of claim 47 wherein generating the regulated signal comprises switching a current through a winding of a transformer at a duty cycle that is related to the second feedback signal.

51. The method of claim 47 wherein maintaining the second feedback signal comprises maintaining the second feedback signal at the substantially constant value in response to the second feedback signal being greater than the first feedback signal.

52. The method of claim 47 wherein maintaining the second feedback signal comprises maintaining the second feedback signal at the substantially constant value in response to the second feedback signal being greater than the first feedback signal.

53. The method of claim 47 wherein maintaining the second feedback signal comprises maintaining the second feedback signal at the substantially constant value in response to the second feedback signal being greater than the first feedback signal and a load coupled to the regulated signal consuming a level of power that is less than a consumption threshold.

54. The method of claim 47 wherein allowing the second feedback signal comprises allowing the second feedback signal to change in response to the second feedback signal being less than or equal to the first feedback signal.

55. The method of claim 47, further comprising:
wherein generating the regulated signal comprises switching a current through a winding of a transformer at a duty cycle that is related to the second feedback signal in response to a clock signal;
switching the current multiple times in response to the clock signal, to the second feedback signal being greater than the first feedback signal, and to a load coupled to the regulated signal consuming a level of power that is less than a consumption threshold; and
cease switching the current when the second feedback signal is less than or equal to the first feedback signal or when the current has been switched a threshold number of times.

56. The method of claim 47, further comprising:
wherein generating the regulated signal comprises generating, in response to a clock signal, a regulated voltage across a secondary winding of a transformer by switching a current through a primary winding of a transformer at a duty cycle that is related to the second feedback signal in response to a clock signal;
switching the current multiple times in response to the clock signal, to a voltage across a capacitor that is coupled across the primary winding being less than the regulated voltage referred to the primary winding, and to a load coupled to the regulated voltage consuming a level of power that is less than a consumption threshold; and
cease switching the current when the voltage across the capacitor is greater than or equal to the regulated voltage referred to the primary winding or when the current has been switched a threshold number of times.

\* \* \* \* \*